United States Patent
Anand

(10) Patent No.: US 6,363,466 B1
(45) Date of Patent: Mar. 26, 2002

(54) INTERFACE AND PROCESS FOR HANDLING OUT-OF-ORDER DATA TRANSACTIONS AND SYNCHRONIZING EVENTS IN A SPLIT-BUS SYSTEM

(75) Inventor: Vishal Anand, Fremont, CA (US)

(73) Assignee: VLSI Technology, Inc., San Jose, CA (US)

( * ) Notice: Subject to any disclaimer, the term of this patent is extended or adjusted under 35 U.S.C. 154(b) by 0 days.

(21) Appl. No.: 09/394,395

(22) Filed: Sep. 13, 1999

(51) Int. Cl.[7] .............................................. G06F 12/00
(52) U.S. Cl. ........................ 711/169; 711/151; 711/158; 710/112
(58) Field of Search ................................ 711/151, 158, 711/169; 710/112

(56) References Cited

U.S. PATENT DOCUMENTS 5,485,586 A * 1/1996 Brash et al. ................. 710/112
5,905,876 A    5/1999 Pawlowski et al. ......... 395/292

FOREIGN PATENT DOCUMENTS

EP    788054 A2    1/1997    ........... G06F/13/16
EP    889412 A2    1/1999    ........... G06F/13/16

* cited by examiner

*Primary Examiner*—Jack A. Lane
(74) *Attorney, Agent, or Firm*—Wagner, Murabito & Hao LLP

(57) ABSTRACT

An interface and process for re-ordering data transactions between a master device and a target device. The present invention applies to target devices that interface to master devices such that both masters and slaves are capable of handling the re-ordering of outstanding requests. In such an interface where data transactions can be in any order, certain events may occur that force the reordering to be limited to either before or after the event. These events, also referred to as synchronizing events herein, require that transactions sampled before the event must be completed before transactions sampled after the event are completed. The present invention is capable of handling such synchronizing events while maximizing reordering to gain maximum performance benefits.

23 Claims, 5 Drawing Sheets

INTERFACE AND PROCESS FOR HANDLING OUT-OF-ORDER DATA TRANSACTIONS AND SYNCHRONIZING EVENTS IN A SPLIT-BUS SYSTEM

FIELD OF THE INVENTION

The present invention relates to the field of bus arbitration in computer systems. More specifically, the present invention relates to a system for and a method of re-ordering data transactions within a computer system.

BACKGROUND OF THE INVENTION

Much of a computer system's functionality and usefulness to a user is derived from the functionality of the peripheral devices. For example, the speed and responsiveness of the graphics adapter is a major factor in a computer system's usefulness as an entertainment device. Or, for example, the speed with which data files can be retrieved from a hard drive determines the computer system's usefulness as a database system. Hence, the rate at which data can be transferred often determines whether the computer system is suited for a particular purpose. The electronics industry has, over time, developed several types of high-performance peripheral bus and memory bus architectures, such as PCI (Peripheral Components Interconnect), AGP (Advanced Graphics Port), etc., which is capable of transferring data at a very high rate.

Peripheral bus and memory bus architectures can be generally classified into three main categories: non-pipelined, pipe-lined and split-bus. Devices such as those conforming to the bus definition of AMBA, PCI etc. perform data transactions in a non-pipelined manner. These devices generally share pins between address and data. In non-pipelined systems, a new data transaction will not start till the successful completion of the prior one. Devices that have separate address and data pins and can issue a new address cycle without waiting for the completion of the previous data phases perform data transactions in a pipe-lined manner. However, these devices impose the restriction that the data phases should completed in the exact same order as the addresses were issued. Some exemplary devices that are capable of performing pipelined data transactions are Pentium® processors, PowerPC® 604 processors and MIPS® SH-2 processors, etc.

In split-bus devices, data transactions are run in a split transaction fashion where the requests for data transfer (or access requests) are "disconnected" from the data transfers. That is, in operation, a master device initiates data transaction with an access request. Then, memory controller or core logic responds to the access request by directing the corresponding data transfer at a later time. The fact that the access requests are separated from the data transfers allows split-bus devices to issue several access requests in a pipelined fashion while waiting for the data transfers to occur. In addition, data transactions may be completed out-of-order. That is, data transactions may be completed in an order different than the one in which the addresses were issued. These features significantly increase the performance of split-bus devices over non-pipelined and pipelined devices.

Current high-performance memory devices such as SDRAM (Synchronous Dynamic Random Access Memory), RAMBUS® RAM, etc. have different latency numbers for cycles based on whether the request is to previously opened pages within the memory or not. Given a certain number of pending requests, the maximum bandwidth achieved will depend on the order in which the cycles are issued to the memory. For instance, if the memory controller can re-order the transactions, maximum performance would be achieved if the memory controller re-orders memory access transactions such that accesses to the same pages can be clustered together.

In a split transaction interface where the data transactions can be re-ordered, certain events may occur that force the reordering to be limited to either before or after the event. These events dictate that any re-ordering should not cross over the synchronizing event. For example, transactions sampled prior to one such event must be completed before transactions sampled after the event are completed. By the same token, transactions sampled after the event must be completed before transactions sampled before the event are completed. Examples of such synchronizing events are address only cycles like sync or eieio in PowerPC®. The events could also be requests from agents like PCI that require snooping on the CPU (central processing unit) bus prior to being serviced by memory. For clarity, these events are called synchronizing events, synchronizing requests or alignment events herein.

In the prior art, the master device (e.g., device initiating the data transaction) must stop issuing data transaction requests once a synchronizing event occurs. The master device may resume issuing data transaction requests until all outstanding data transaction requests have been completed. Consequently, data transfer rate would be decreased by the occurrence of such synchronizing events. Impact on the data transfer rate can be severe if these synchronizing events occur frequently.

Therefore, what is needed is a system and method for handling synchronizing events without stalling the master devices such that maximum performance benefits can be gained.

SUMMARY OF THE DISCLOSURE

Accordingly, the present invention provides an interface and process for handling out-of-order data transactions and synchronizing events while maximizing re-ordering to gain maximum performance benefits. The present invention is applicable to target devices that interface to master devices such that both masters and slaves are capable of handling the re-ordering of outstanding requests.

In one embodiment, the method of the present invention is applicable to a memory controller that receives memory access requests and synchronizing events generated by a processor (e.g., a central processing unit CPU). Upon receiving a first synchronizing event from the master device, the memory controller presents a first plurality of memory access requests to a memory access request arbiter in parallel for re-ordering. When the first plurality of memory access requests are serviced by the memory access request arbiter, the memory controller continues to receive a second plurality of memory access requests generated by the processor. Significantly, the processor is not stalled when the first plurality of memory access requests are being serviced. After the first plurality of memory access requests have been completed, the memory controller processes the first synchronizing event. Thereafter, the second plurality of memory access requests are presented to the memory access request arbiter in parallel for re-ordering.

In one particular embodiment, an identifier (e.g., a synchronizing request number SRN) is added by the memory controller to each of one of the memory access requests. The identifier indicates a storage location of a preceding synchronizing event. The memory controller monitors that storage location such that, as soon as the preceding synchronizing request is processed, the memory access requests whose identifiers indicating the storage location can be presented to the arbiter. The same identifier is also inserted into another synchronizing event that follows the preceding synchronizing event. The memory controller monitors the storage location indicated by the identifier and all other storage locations containing memory access requests that are associated with the identifier. A synchronizing events, however, will be processed only when all preceding memory access requests are completed and when the preceding synchronizing event is processed. In essence, the memory access requests and the synchronizing events are self-tracking such that proper re-ordering boundaries can be maintained.

Embodiments of the present invention include the above and further include a computer system that includes a processor, a processor bus coupling the processor to a memory controller, a memory bus coupling the memory controller to a memory. The memory controller of the present embodiment includes a memory access request arbiter for re-ordering memory access requests; a buffer that has a plurality of storage locations for storing memory access requests and synchronizing events; and a request screening unit that causes the buffer to present a first plurality of memory access requests to the memory access request arbiter in parallel upon receiving a first synchronizing event without stalling the processor.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION

Figure 1:
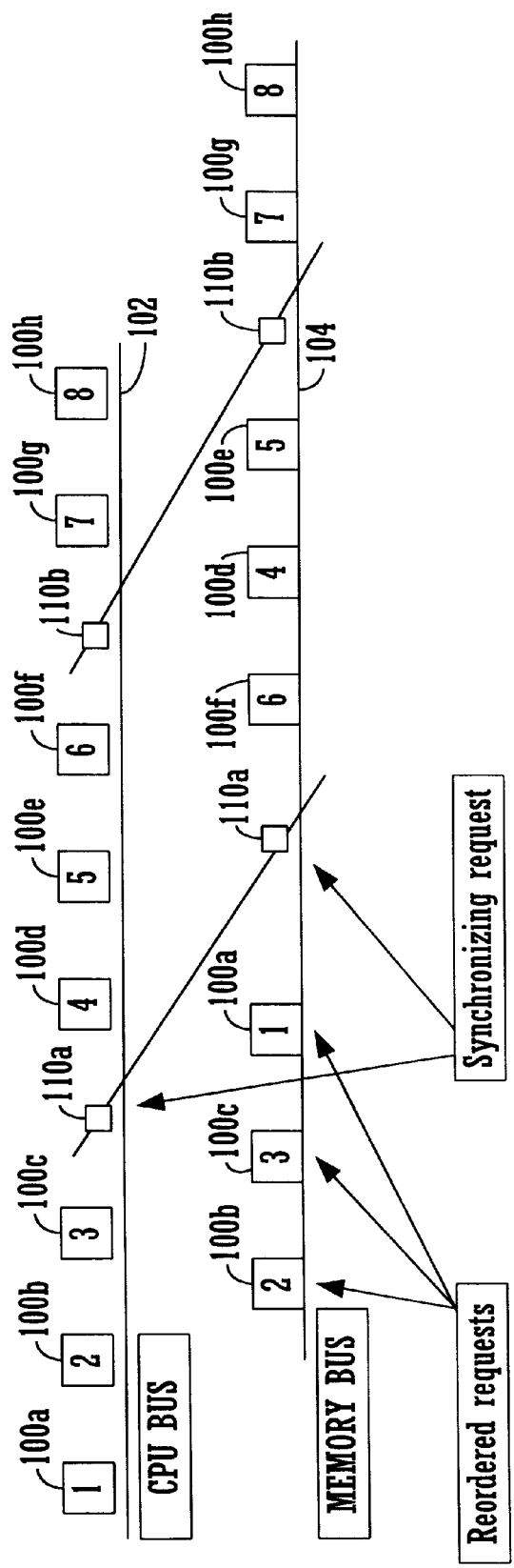
FIG. 1 illustrates a sequence of requests for data transfer and synchronizing events that are placed on a CPU bus and a re-ordered sequence of requests and synchronizing events that are placed on a memory bus.

In the following detailed description of the preferred embodiments, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

I. Notation and Nomenclature

Some portions of the detailed descriptions which follow are presented in terms of procedures, steps, logic blocks, processing, and other symbolic representations of operations on data bits within a computer or similar electronic devices. These descriptions and representations are the means used by those skilled in the data processing arts to most effectively convey the substance of their work to others skilled in the art. A procedure, computer executed step, logic block, process, etc., is. here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing", "determining", "performing", "receiving", "assigning" or the like, refer to the actions and processes of a computer system or similar electronic computing devices. The computer system or similar electronic device manipulates and transforms data represented as electronic quantities within the computer system's registers and memories into other data similarly represented as physical quantities within the computer system memories or registers or other such information storage, transmission, or display devices.

System and Method for Handling Synchronizing Events According to the Present Invention Embodiments of the present invention, an interface and process for handling synchronizing events and out-of-order data transactions, may be implemented within a computer system. More specifically, embodiments of the present invention may be implemented as part of the core logic of computer system. In other embodiments, the present invention may be implemented within a processor of the computer system or within a memory subsystem of a computer system.

More specifically, embodiments of the present invention are applicable to devices that support split-bus transactions. In systems that support split-bus transactions, requests for data transfer are "disconnected" from the data transfers. Further, in such systems, it may be advantageous to re-order the requests for data transfer. For example, the memory may be faster if accesses to the same pages are clustered together. Thus, by re-ordering the requests for data transfer in a certain way, a significant increase in memory bandwidth can be achieved.

Certain events, however, may force the reordering to be limited to either before or after the events. These events dictate that any reordering should not cross over the synchronizing request. For clarity, these events are called synchronizing events, synchronizing requests or alignment events herein. FIG. 1 illustrates a sequence of requests for data transfer 100a–100h and synchronizing events 110a–110b placed on a CPU bus 102 by a processor. As illustrated, the requests for data transfer 100a–100h and synchronizing events 110a–110b have a initial ordering. Specifically, request 100a is followed by request 100b, which is followed by request 100c and which is followed by synchronizing event 100a, etc.

Synchronizing requests 110a–110b act as "boundaries" for re-ordering of the data transfer requests 100a–100h. Also illustrated in FIG. 1 is a re-ordered sequence of the requests for data transfer 100a–100h placed by the interface of the present invention on a memory bus 104. As illustrated in FIG. 1, request 100b is followed by request 100c and subsequently by request 100a. Requests 100a–100c are, in turn, followed by synchronizing request 110a. Requests 100f, 100d and 100e follow synchronizing request 110a and are followed by synchronizing event 110b. Synchronizing event 110b is followed by request 110g–100h. Although the ordering of requests 100a–100b are changed, synchronizing event 110a–110b impose limitations on the re-ordering of the requests 100a–100h. Address only cycles like sync or eieio in PowerPC® are examples of synchronizing events. The events could also be requests from agents like PCI that require snooping on the CPU (central processing unit) bus prior to being serviced by memory. The present invention provides for a method and system for handling these synchronizing events with minimal impact on performance.

Figure 2:
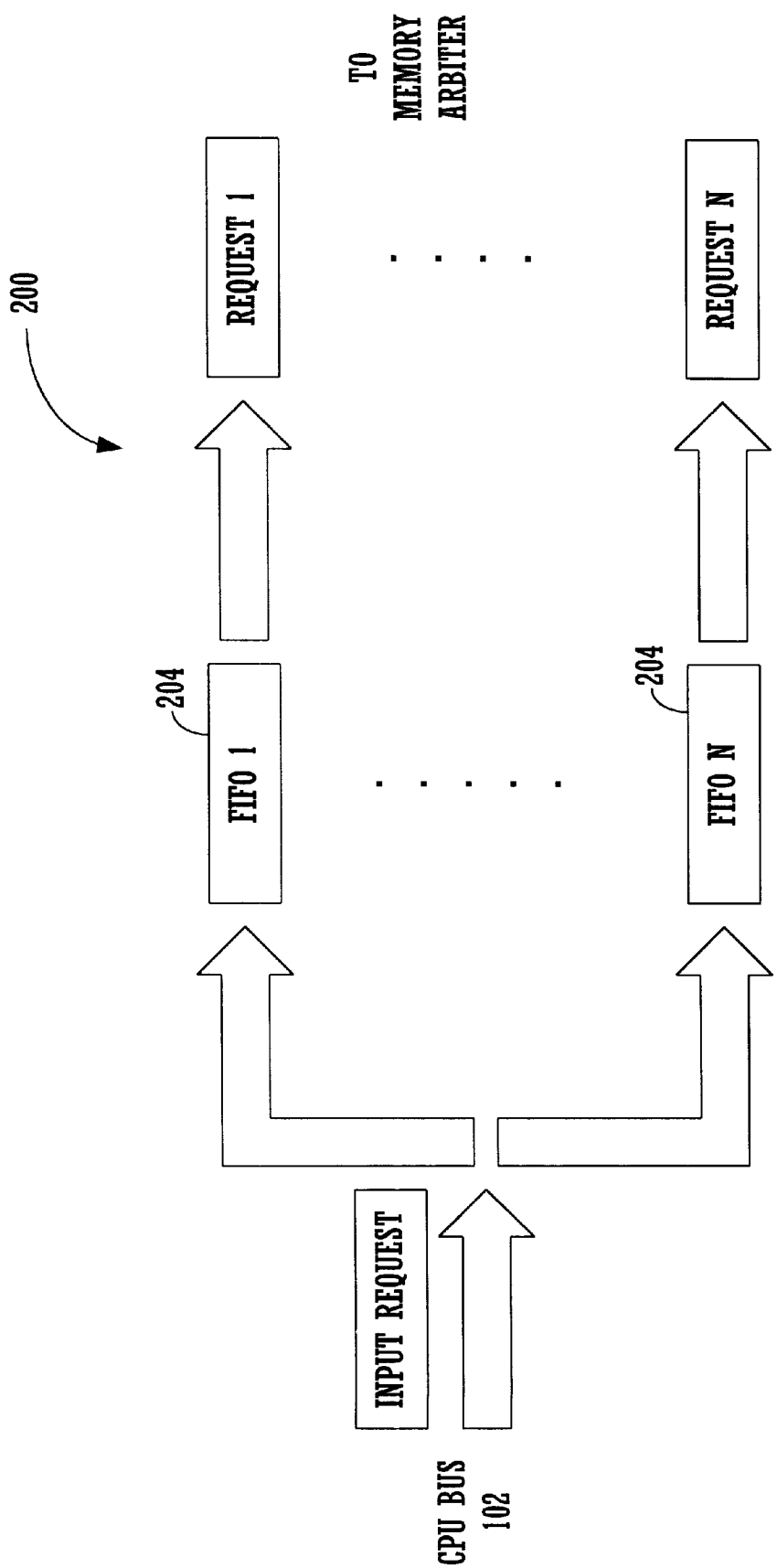
FIG. 2 is a logical block diagram of an interface between a processor and memory in accordance with an embodiment of the present invention.

FIG. 2 is a logical block diagram of an interface 200 between a processor and memory in accordance with an embodiment of the present invention. As shown, the interface 200 receives memory access requests from CPU bus 102 and stores the memory access requests in one of a plurality of subqueues 204. In the illustrated embodiment, there are N subqueues 204. Typically, each subqueue 204 is implemented as a simple first-in-first-out memory unit (FIFO). According to one embodiment, each subqueue 204 may corresponding to a type of requests. For instance, FIFO 1 of FIG. 1 may be used for storing HIGH-PRIORITY WRITE requests and FIFO N of FIG. 2 may be used for storing HIGH-PRIORITY READ requests. Logic circuits for placing memory access requests into appropriate subqueues is well known in the art. A more advanced implementation of the subqueues is described in greater detail in co-pending U.S. patent application Ser. No. 09/005,358, entitled "A SINGLE ADDRESS QUEUE FOR HANDLING MULTIPLE PRIORITY REQUESTS", by the V. Anand, which is incorporated herein by reference.

After memory access requests are stored in the interface 200, they are selectively presented to a memory controller arbiter (not shown) for re-ordering. The memory controller arbiter can service any of the "N" requests based on the current pages open within the memory. Significantly, according to the illustrated embodiment, interface 200 only "reveals" to the memory controller arbiter requests for data transfer that precede an unprocessed synchronizing event. The unprocessed synchronizing event and other requests for data transfer that follow the unprocessed synchronizing event are "hidden" from the arbiter by the interface 200. In this way, the memory controller arbiter is able to re-ordering order the requests for data transfer free from any limitations imposed by synchronizing events. After all the requests for data transfer that precede an unprocessed synchronizing event are completed, interface 200 then "reveals" the unprocessed synchronizing event to the arbiter 208 for processing. After the synchronizing event is "revealed" and processed, requests for data transfer that follow the synchronizing event are "revealed" to the arbiter for re-ordering. This process is then repeated for the next synchronizing event and the next set of requests for data transfer.

An advantage of the present embodiment as illustrated in FIG. 2 is that arbiter does not have to be aware of the request screening process. Indeed, conventional memory access arbiters may be used. Another distinct advantage of the present embodiment is that the master device (e.g., processor 204) is not stalled after issuing a synchronizing event. In contrast, in prior art split-bus systems, the master device must be stopped from issuing new requests for data transfer until after the synchronizing event is processed.

In accordance with one embodiment of the present invention, in order to selectively "reveal" memory access requests to the memory controller arbiter for re-ordering, a set of control signals are defined below in Table 1.

TABLE 1

| Signal Name | Definition |
| --- | --- |
| Valid | Indicates to the memory controller that the request seen at that port is valid |
| Pre-Valid | Used to control the "Valid" signal |
| Synchronizing Request Number (SRN) | Stores the queue number where the previous synchronizing request is stored |

In one embodiment of the present invention, each memory access request is associated with a VALID bit and a PRE-VALID bit. Each memory access request is also associated with a Synchronizing Request Number (SRN) that corresponds to the storage location (e.g., queue number) in which the preceding synchronizing event (or synchronizing request) is stored. For example, an SRN of X will be stored associated with a memory access request if the preceding synchronizing event is stored in subqueue X of the interface. In the present embodiment, these three signals are controlled according to Table 2 below.

TABLE 2

| Type of Request | |
| --- | --- |
| Synchronizing | Transition from Pre = 1 Valid = 0 To Pre = 1 Valid = 1 |
| Synchronizing | When SRN is Pre = 0 Valid = 0 & all Valid = 1 have transitioned to Valid = 0 |
| Non Synchronizing | When SRN becomes Pre = 0 Valid = 0 |

According to the present invention, the PRE-VALID bit associated with a memory access request is asserted when it is received by the interface 200. The VALID bit associated with a memory access request (e.g., a non-synchronizing request) becomes asserted when the associated PRE-VALID bit is asserted and when the VALID bit and PRE-VALID bit associated with the SRN (e.g., the preceding synchronizing request) are unasserted. When a VALID-bit associated with a memory access request is asserted, the memory controller arbiter will consider the memory access request valid and will accept it for re-ordering. It should be noted that, in the present embodiment, when memory access request is stored within the subqueues 204, it does not immediately become VALID. Rather, when the memory access request is stored, only the PRE-VALID bit associated with the memory access request is asserted.

In accordance with the present embodiment, the PRE-VALID bit associated with a synchronizing event is asserted when it is received by the interface 200. The VALID bit associated with a synchronizing request becomes asserted only when the VALID bit and PRE-VALID bit associated with the SRN (i.e., a preceding synchronizing request) and all other VALID bits associated with all the other memory access requests have become unasserted. When the VALID bit associated with a synchronizing request becomes asserted, it is considered valid by the memory controller arbiter for processing. It should be noted that, in the present embodiment, only one synchronizing request will be considered valid by the memory controller arbiter at a time.

The present invention has the advantage of the requests modifying themselves in order to preserve the desired sequence. The memory controller arbiter when used with the present invention does not have to be aware of the control signals defined above.

Figure 3:
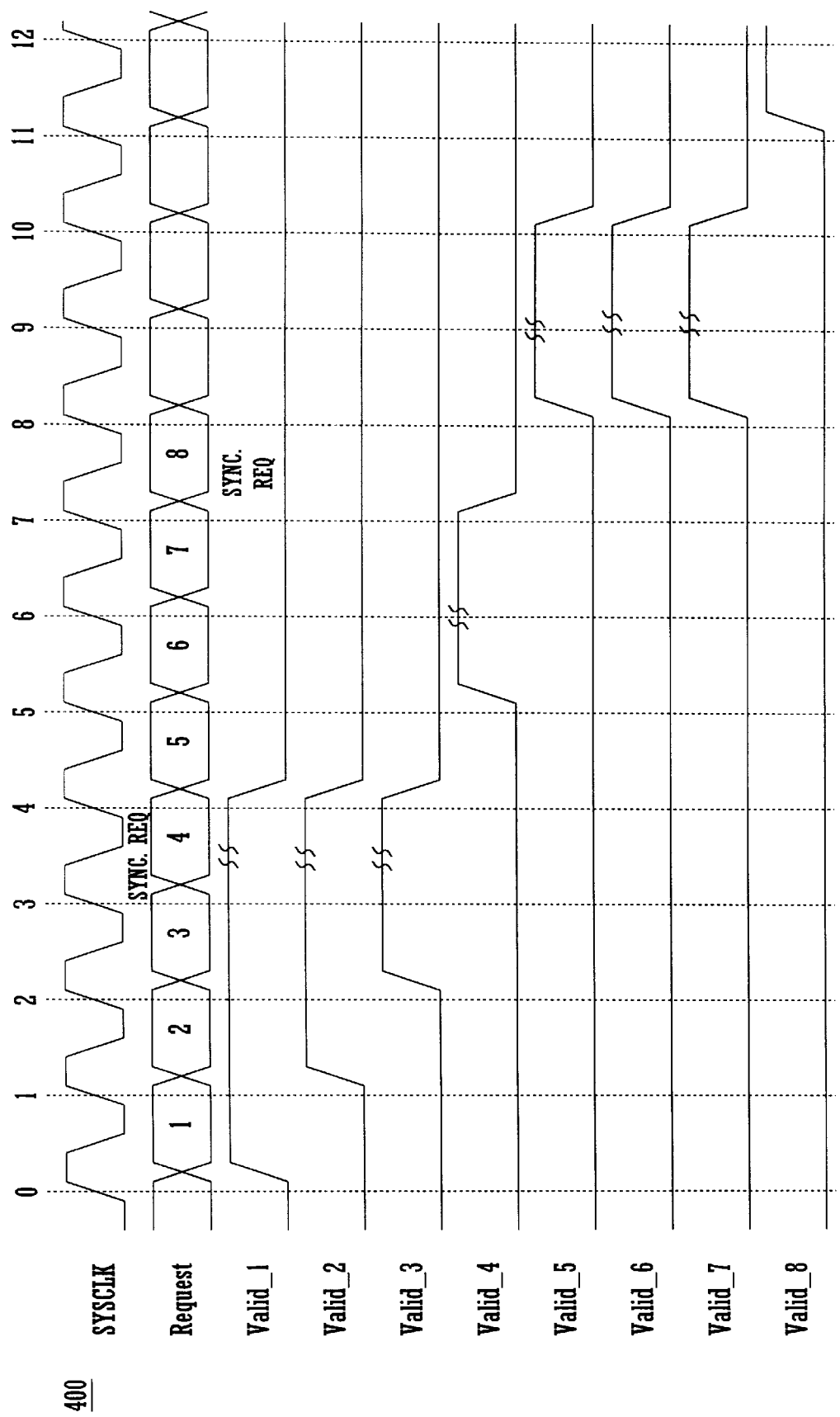
FIG. 3 is a timing diagram illustrating a sequence of requests numbered 1 to 8 received from a CPU bus in accordance with one embodiment of the present invention.

FIG. 3 is an exemplary timing diagram 400 illustrating a sequence of requests numbered 1 to 8 received from the CPU bus in accordance with one embodiment of the present invention. The requests numbered 4 and 8 are synchronizing requests. Requests numbered 1–3 and 5–7 are non-synchronizing requests.

As illustrated, the SRN for requests 1 to 4 is NULL because no preceding synchronizing request precedes requests 1 to 4. For requests 5 to 8, the SRN is 4 because the preceding synchronizing request is numbered 4. For requests 9 to 11, the SRN is 8 because the preceding synchronizing request is numbered 8. The VALID bits of requests 1 to 3 (Valid__1, Valid__2 and Valid__3) are asserted as the requests are sampled. The VALID bit corresponding to request 4 (Valid__4) is asserted when all the other VALID bits (e.g., Valid__1, Valid__2, Valid__3, Valid__5, Valid__6, Valid__7 and Valid__8) are unasserted. The VALID bits associated with requests 5 to 7 (Valid__5, Valid__6 and Valid__7) are asserted when the VALID bit associated with request 4 (Valid__4) transitions to inactive from active. The VALID bit associated with request 8 (Valid__8) is asserted when the VALID bits of requests 5–7 (Valid__5, Valid__6 and Valid__7) are sampled inactive.

Figure 4:
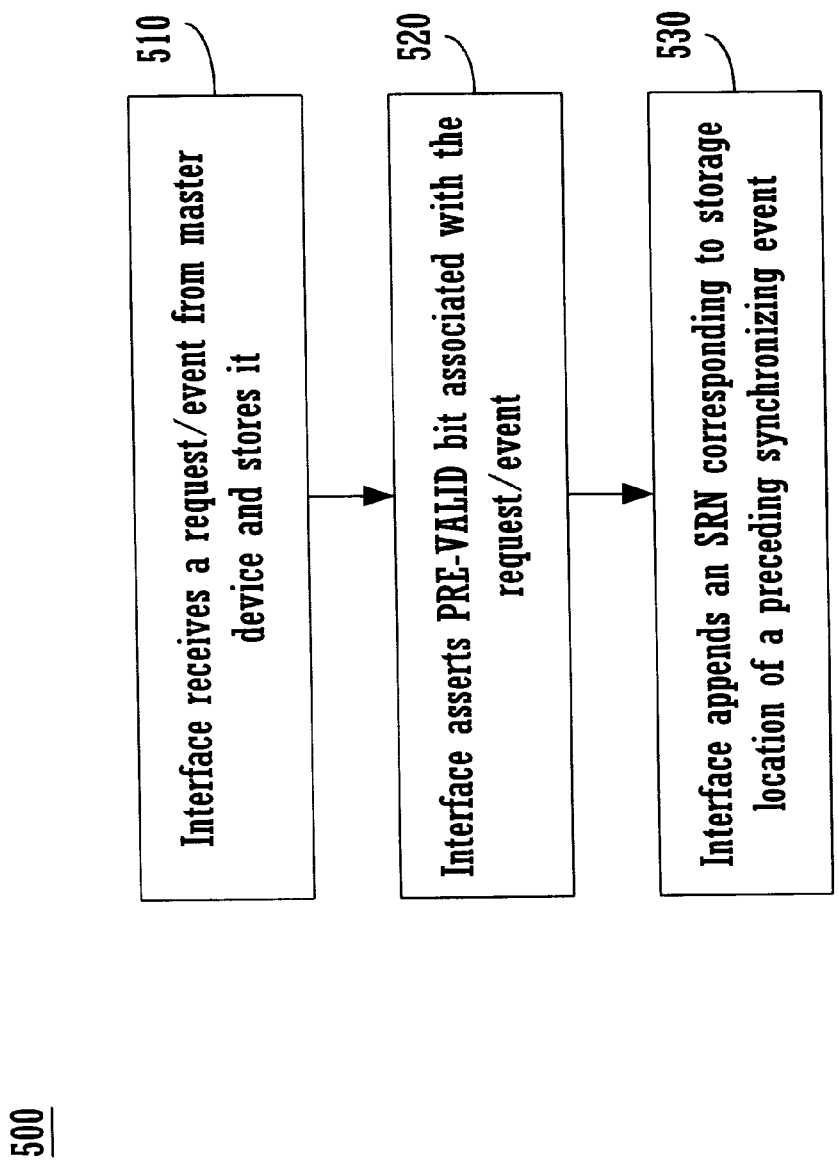
FIG. 4 is a flow chart diagram illustrating the process of storing non-synchronizing requests and synchronizing events in accordance with one embodiment of the present invention.

FIG. 4 is a flow chart diagram 500 illustrating the process of storing non-synchronizing requests and synchronizing events in accordance with one embodiment of the present invention. At step 510, an interface (e.g., interface 200) between a master device and a target device receives a request/event from the master device, and stores the request/event within its buffer (e.g., subqueues 204).

At step 520, the interface asserts a PRE-VALID bit associated with the request/event. Then, at step 530, the interface appends a Synchronizing Request Number (SRN) corresponding to a storage location (e.g., queue number) of a previously received synchronizing event. For example, if a previously received synchronizing event is stored in queue 4 of the interface, then an SRN of 4 is appended to the request/event.

As new requests/events are received from the master device, steps 510–530 are repeated. In the present embodiment, the interface continues to receive new requests/events from the master device without stalling unless the buffers (e.g., queues 204) are full.

Figure 5:
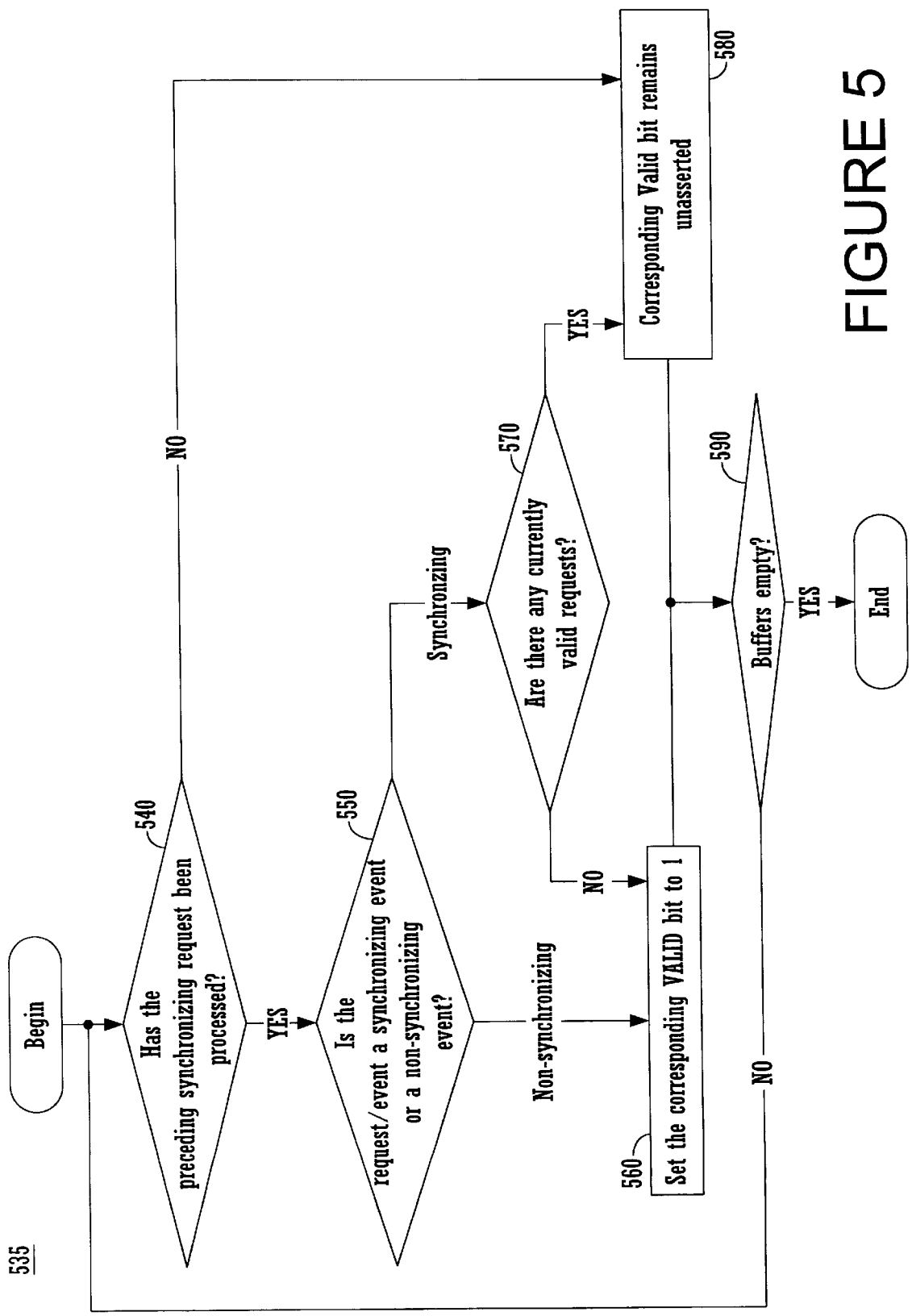
FIG. 5 is a flow chart diagram illustrating the process of selectively presenting non-synchronizing requests to a memory controller arbiter for re-ordering in accordance with one embodiment of the present invention.

FIG. 5 is a flow chart diagram 535 illustrating the process of selectively presenting non-synchronizing requests to a memory controller arbiter for re-ordering in accordance with one embodiment of the present invention.

As illustrated, at step 540, it is determined whether the previously received synchronizing event (or, preceding synchronizing event) has been processed. The interface performs step 540 by checking the storage location as indicated by the SRN of the request/event. For example, if the previously received synchronizing event is stored in queue 4, the interface will check queue 4 to determine whether the synchronizing event stored therein is processed. Particularly, the interface monitors the PRE-VALID bit and VALID bit associated with the preceding synchronizing event to determine whether it has been processed. For example, if the PRE-VALID bit is "1" and the VALID bit is "0", then the preceding synchronizing event has not yet been processed. As another example, if the PRE-VALID bit and the VALID bit are both "0", then it can be presumed that the preceding synchronizing event has already been processed.

At step 550, the interface determines whether a request/event that has propagated to the output port of the interface (e.g., interface 200) is a synchronizing event (e.g., sync or eieio) or a non-synchronizing request (e.g., memory access requests).

At step 560, if it is determined that the preceding synchronizing event has been processed (e.g., both PRE-VALID and VALID bits associated with the preceding synchronizing event are "0") and that the request/event is a non-synchronizing event, then the VALID bit associated with the request/event is asserted. When the VALID bit associated with the request/event is asserted, the memory controller arbiter at the output port of the interface will consider the request/event as being valid. Thus, the memory controller arbiter will then accept the request/event for re-ordering.

At step 570, if it is determined that the preceding synchronizing event has not yet been processed (e.g., PRE-VALID is "1" and VALID is "0"), then the VALID bit associated with the request/event remains unasserted. Hence, the request/event have to wait until the preceding synchronizing event has been processed before it will be accepted by the memory controller arbiter for re-ordering.

At step 580, if it is determined that the request/event is a synchronizing event (e.g., sync or eieio) and that the preceding synchronizing event has already been processed, the interface checks whether there are any currently valid requests.

If it is determined that the preceding synchronizing event has been processed (e.g., both PRE-VALID and VALID bits associated with the preceding synchronizing event are "0"), and that there are no outstanding valid requests (e.g., all VALID bits are "0"), the corresponding VALID bit is set to 1 and the request/event (which is a synchronizing request) is presented to the memory controller arbiter for processing at step 560.

If it is determined that the preceding synchronizing event has been processed (e.g., both PRE-VALID and VALID bits associated with the preceding synchronizing event are "0"), but there are outstanding valid requests (e.g., at least one VALID bit is "1"), the interface waits until all the outstanding valid requests are processed before presenting the synchronizing request to the memory controller arbiter.

At step 590, the interface determines whether the buffers of the interface are not yet empty. If it is determined that the buffers are not empty, steps 540 to 590 are repeated until all the requests stored within the buffers are processed. Otherwise, the process ends.

The present invention, an interface and process for handling out-of-order data transactions and synchronizing events, has thus been disclosed. By using SRNs, PRE-VALID and VALID bits, re-ordering of data transactions can be performed while respecting the re-ordering boundaries dictated by synchronizing events. In comparison to prior art systems where the master device must be stalled when a synchronizing event is encountered, the interface and process of the present invention provides significant improvement in performance. An additional benefit of the present invention is that the memory controller arbiter needs not be aware of the process. Thus, conventional memory controller arbiter can be used.

While the present invention has been described in particular embodiments, it should be appreciated that the present invention should not be construed as limited by such embodiments, but should be construed according to the below claims.

What is claimed is:

1. In a computer system, a method of processing memory access requests generated by a master device, said method comprising the steps of:
   a) receiving a first plurality of memory access requests generated by said master device;
   b) upon receiving a first synchronizing request from said master device, presenting a first plurality of memory access requests to a memory access request arbiter in parallel for re-ordering thereof;
   c) receiving a second plurality of memory access requests generated by said master device when said first plurality of memory access requests are serviced by said memory access request arbiter;
   d) processing said first synchronizing request after said first plurality of memory access requests have been completed; and
   e) upon receiving a second synchronizing request from said master device, presenting said second plurality of memory access requests to said memory access request arbiter in parallel for re-ordering thereof.

2. A method as recited in claim 1 wherein said step (c) comprises the step of appending an identifier to a respective one of said second plurality of memory access requests wherein said identifier indicates a storage location of said first synchronizing request.

3. A method as recited in claim 2 wherein said step (a) further comprises the step of appending said identifier to a second synchronizing request that follows said set of memory access requests.

4. A method as recited in claim 2 wherein said step (b) comprises the step of monitoring said storage location to determine whether said first synchronizing request has been processed.

5. A method as recited in claim 1 wherein step (d) further comprises the step of monitoring storage locations of said first plurality of memory access requests to determine whether said first plurality of memory access requests have been completed.

6. A method as recited in claim 1 wherein said step (b) comprises the step of presenting said set of memory access requests to a memory access request arbiter for re-ordering thereof.

7. A method as recited in claim 1 wherein said master device comprises a central-processing unit (CPU).

8. A computer system comprising:
   a processor;
   a first bus coupled to said processor;
   a memory controller coupled to said processor via said first bus;
   a memory coupled to said memory controller via a second bus;
   wherein said memory controller further comprises:
      a memory access request arbiter for re-ordering memory access requests;
      a buffer that has a plurality of storage locations for storing memory access requests and synchronizing requests; and
      a request selection unit that causes said buffer to present a first plurality of memory access requests in parallel to said memory access request arbiter upon receiving a first synchronizing request without stalling said processor.

9. A computer system as recited in claim 8 wherein said memory controller continues to receive a second plurality of memory access requests generated by said processor while said first plurality of memory access requests are serviced by said memory.

10. A computer system as recited in claim 9 wherein said request selection unit appends an identifier to each of said second plurality of memory access requests wherein said identifier indicates a storage location of said first synchronizing request.

11. A computer system as recited in claim 10 wherein said request selection unit determines whether said second plurality of memory access requests are ready to be serviced by said memory by monitoring said storage location of said first synchronizing request.

12. A computer system as recited in claim 10 wherein said request selection unit determines whether said first synchronizing request is ready to be processed by monitoring storage locations of said first plurality of memory access requests.

13. A memory controller as recited in claim 10 wherein said request selection unit determines whether said second plurality of memory access requests are ready to be serviced by said memory by monitoring said storage location of said first synchronizing request.

14. A memory controller as recited in claim 10 wherein said request selection unit determines whether said first synchronizing request is ready to be processed by monitoring storage locations of said first plurality of memory access requests.

15. A computer system as recited in claim 9 wherein said request selection unit causes said buffer to present said second plurality of memory access requests in parallel to said memory access request arbiter upon receiving a second plurality of memory access requests without stalling said processor.

16. A computer system as recited in claim 15 wherein said request selection unit appends an identifier to said second synchronizing request wherein said identifier indicates a storage location of said first synchronizing request.

17. A computer system as recited in claim 16 wherein said memory controller determines whether said second synchronizing request is ready to be processed by monitoring said storage location of said first synchronizing request and storage locations of said first plurality of memory access requests.

18. A memory controller as recited in claim 16 wherein said memory controller determines whether said second synchronizing request is ready to be processed by monitoring said storage location of said first synchronizing request and storage locations of said first plurality of memory access requests.

19. A memory controller as recited in claim 15 wherein said request selection unit appends an identifier to said second synchronizing request wherein said identifier indicates a storage location of said first synchronizing request.

20. A memory controller as recited in claim 9 wherein said request selection unit appends an identifier to each of said second plurality of memory access requests wherein said identifier indicates a storage location of said first synchronizing request.

21. A memory controller as recited in claim 9 wherein said request selection unit causes said buffer to present said second plurality of memory access requests in parallel to said memory access request arbiter upon receiving a second plurality of memory access requests without stalling said processor.

22. A memory controller as recited in claim 8 wherein said memory controller continues to receive a second plurality of memory access requests generated by said processor while said first plurality of memory access requests are serviced by said memory.

23. A memory controller comprising:

an input for coupling to a master device and for receiving memory access requests generated by said master device;

a memory access request arbiter for re-ordering memory access requests generated by said master device;

a buffer that has a plurality of storage locations for storing memory access requests and synchronizing requests generated by said master device; and a request selection unit that causes said buffer to present a first plurality of memory access requests in parallel to said memory access request arbiter upon receiving a first synchronizing request without stalling said processor.

* * * * *